(12) United States Patent
Beilfuss et al.

(10) Patent No.: US 11,104,200 B2
(45) Date of Patent: Aug. 31, 2021

(54) METHOD FOR PRODUCING AN AXLE COMPONENT

(71) Applicant: Benteler Automobiltechnik GmbH, Paderborn (DE)

(72) Inventors: Soeren Beilfuss, Paderborn (DE); Mesut Suerahi, Loehne (DE); Goddy Hutabarat, Paderborn (DE); Erik Schultz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 73 days.

(21) Appl. No.: 16/548,019

(22) Filed: Aug. 22, 2019

(65) Prior Publication Data
US 2020/0062072 A1  Feb. 27, 2020

(30) Foreign Application Priority Data
Aug. 22, 2018 (DE) ...................... 10 2018 120 479.5

(51) Int. Cl.
*B60G 21/05* (2006.01)

(52) U.S. Cl.
CPC ........ *B60G 21/051* (2013.01); *B60G 2200/21* (2013.01); *B60G 2206/8201* (2013.01)

(58) Field of Classification Search
CPC .......... B60G 21/051; B60G 2206/8201; B60G 2200/21; B60G 2206/91; B60G 2206/8106; B60G 2200/46; B60G 2200/4622; B60G 21/0551; B60G 21/05; B23K 31/02; B23K 33/004; B23K 2101/006
See application file for complete search history.

(56) References Cited

U.S. PATENT DOCUMENTS 4,654,505 A * 3/1987 Sciaky ................. B23K 26/067
                                                    219/121.63
5,897,139 A * 4/1999 Aloe ....................... B60G 7/02
                                                    280/781
(Continued)

FOREIGN PATENT DOCUMENTS

| DE | 8227474 U1     | 1/1983  |
| DE | 102008021155 A1 | 10/2009 |
| DE | 102016109796 A1 | 11/2017 |

OTHER PUBLICATIONS

Office Action for German Application No. 10 2018 120 479.5 dated May 16, 2019; 13pp.

(Continued)

*Primary Examiner* — Drew J Brown
(74) *Attorney, Agent, or Firm* — Hauptman Ham, LLP

(57) ABSTRACT

The disclosure relates to a method for producing an axle component for a motor vehicle, in which at least two metallic axle parts are joined integrally to one another. The axle component is a twist beam axle, in which lateral trailing arms are connected to each other via a transverse profile. In order to establish a target geometry of the axle component, the heat induced by a welding operation is utilized. The welding operation can be a specifically positioned weld, an additional weld or a blind weld. The heat of welding is utilized in order to achieve a compensation deformation and to compensate for distortion states and/or to align the axle component.

6 Claims, 2 Drawing Sheets

(56) References Cited

U.S. PATENT DOCUMENTS

| | | | | |
|---|---|---|---|---|
| 6,325,567 B1* | 12/2001 | Kato | ................... | B60G 7/001 |
| | | | | 403/270 |
| 2004/0007846 A1* | 1/2004 | Inoue | ................... | B60G 7/008 |
| | | | | 280/124.166 |
| 2004/0100062 A1* | 5/2004 | Inoue | ................... | B60G 3/20 |
| | | | | 280/124.135 |
| 2005/0156462 A1* | 7/2005 | Abrat | ................... | B60G 9/003 |
| | | | | 301/125 |
| 2007/0290474 A1* | 12/2007 | Inoue | ................. | B60G 21/051 |
| | | | | 280/124.166 |
| 2012/0279949 A1* | 11/2012 | Simmons | ........... | B23K 37/0533 |
| | | | | 219/159 |
| 2014/0077472 A1* | 3/2014 | Piehl | ................... | B60G 11/27 |
| | | | | 280/124.116 |
| 2017/0095875 A1* | 4/2017 | Mizobata | ................ | B23K 9/007 |
| 2018/0065204 A1* | 3/2018 | Burrows | ............ | G05B 19/4207 |
| 2020/0271627 A1* | 8/2020 | Battenberg | ............. | B25J 9/1666 |

OTHER PUBLICATIONS

H.J. Fahrenwaldt et al., "Flame straightening," Praxiswissen Schweisstechnik, 5. Auflage. Wiesbaden : Springer Vieweg, 2014. pp. 265-275. ISBN 978-3-658-03141-1 (eBook); 22pp.

\* cited by examiner

METHOD FOR PRODUCING AN AXLE COMPONENT

RELATED APPLICATIONS

The present application claims priority of German Application Number 10 2018 120 479.5 filed Aug. 22, 2018, the disclosure of which is hereby incorporated by reference herein in its entirety.

FIELD

The disclosure relates to a method for producing an axle component for a motor vehicle, in which at least two metallic axle parts are joined integrally to one another.

BACKGROUND

An axle component in the sense of the disclosure is a motor vehicle axle, like a twist beam axle. Such a twist beam axle is described, for example, in DE 10 2009 004 441 A1.

Axle parts are trailing arms or crossbeams or transverse profiles. To produce an axle component in the form of a twist beam axle, two trailing arms are connected to each other via a transverse profile. Further axle parts can be joined to the axle component, for example wheel carriers or spring seats.

Axle components must satisfy high tolerance requirements. Twist beam axles are fabricated with close tolerances. The requirements on the correct setting of the toe angle and camber angle are high. The tolerances are achieved in that the laterally arranged wheel carriers of the twist beam axles are re-machined by material-removing machining. In order to permit material-removing machining, a certain surplus of material has to be taken into account as a machining allowance in each part.

According to DE 40 08 706 C2, Steel Carrier Plates are Welded onto the Wheel Carriers as a Machining Allowance.

Material allowance causes extra costs. Added to this are the costs for the machining process. The costs for the machining are composed of the pure machining costs and the wear costs for the tools. At the same time, during the machining, reworking is required, for example as a result of deburring and additional cleaning operations.

SUMMARY

On the basis of the prior art, the disclosure is based on the object of indicating a method for producing an axle component for a motor vehicle which fulfils the required target geometries and tolerance requirements and at the same time simplifies the production and reduces the material consumption.

According to the disclosure, this object is achieved by a method according to at least one of the embodiments.

Refinements and developments of the method according to one or more embodiments of the disclosure are the subject matter of at least one of the embodiments.

In the method according to one or more embodiments of the disclosure, in order to establish a target geometry of the axle component, the heat induced by a welding operation is utilized.

The heat introduced into the part by a welding process is utilized to establish the target geometry, to compensate for any distortion and to comply with the predefined tolerances. A local influence that is suitable for the part is exerted on the part geometry while adapting to the thermo-mechanical structural situation of the axle parts joined to form the axle component. By means of one or more welding operations, coordinated with the target geometry to be achieved, a compensatory deformation is deliberately introduced where there are causes of distortion or tolerances have to be addressed.

The welding operation provided according to one or more embodiments of the disclosure can be a specifically positioned weld and/or at least one additional weld and/or a blind weld.

A specifically positioned weld is a weld which is developed during the construction or the design of the axle component or the axle parts and is placed during the assembly of the axle parts.

An additional weld is a weld which is additionally applied along joining edges or else is placed during the fixing of further axle parts.

A blind weld is a weld which is deliberately placed at selected part locations or positions without any joining function, in order to establish the target geometry, to compensate for distortion and/or to align the axle components in their position relative to one another. Joining or connecting to a further axle part is not carried out during blind welding.

One aspect provides for the weld position and/or the geometry thereof to be determined with computer assistance and for the weld to be placed during the assembly of the axle component. Here, provision is made for such welds to be determined in advance during the design layout of the axle component and then placed specifically during assembly. The aim is the compensation of distortion occurring during the assembly of the axle component and the specific alignment of the axle parts within the axle component.

Furthermore, it is possible for the welding parameters to be determined and set in real time during the assembly of the axle components. Welding parameters are the setting of the welding current or intensity, the welding time or the electrode force, along with the feed rate. In addition to the welding parameters, the geometry of the welds plays a great role, i.e. the weld length and direction, the spatial profile and the order of production.

In this connection, to measure the axle component during the production process, and to carry out the welding operation depending on the intended target geometry of the axle component. This is done during the production process of the axle component. It is important to measure the axle component before the last welding operation and to place the last welding operation in such a way that the target geometry of the axle component is established.

By means of the method according to one or more embodiments of the disclosure, it is possible to produce axle components of high quality which reliably comply with the tolerance requirements. At the same time, production is simplified and the use and consumption of material are reduced.

The disclosure makes use of the effect that, as a result of the induced heat from a welding operation with the subsequent cooling of the weld, the axle component is drawn specifically into the desired target geometry. In this way, a neutral state of distortion which corresponds to the target geometry can be established in the part.

During the production of an axle component in the form of a twist beam axle, for example firstly two trailing arms are connected to each other via a transverse profile or crossbeam. The wheel carriers are fixed to the trailing arms. Furthermore, further axle parts, for example gusset plates between trailing arm and crossbeams or spring seats, are joined on. The axle parts are connected to one another by welding. The fabrication sequence can differ from the aforementioned order.

During the assembly of the axle parts or thereafter, the axle component is measured. The actual values determined form the actual geometry. The actual geometry is compared with target values from a target geometry in order to determine whether the predefined tolerances are or have been complied with during the fabrication.

In the event that the actual geometry deviates from the target geometry outside tolerance values or limits, the axle parts are aligned relative to one another.

This is carried out by means of a welding operation and the utilization of the heat induced thereby.

Such welds for aligning the axle component in the target geometry can be taken into account at the start during the design of the axle component. However, measurement in real time during the assembly for the respective axle component can also be performed and, in the course of production, targeted welding operations for establishing the target geometry can be performed. As already explained above, a measurement can be made before a final last welding operation, so that alignment in the target geometry is effected with the last welding operation.

In addition, a subsequent welding operation, like blind welding, for the induction of heat and the alignment of the axle component in the target geometry is possible.

The axle component produced in accordance with the disclosure, as compared with subsequently machined axle components, is distinguished by a lower weight, less use of material and less reworking. In addition, expensive equipment can be saved and the costs for space and tools can be reduced, since the welding operation provided in accordance with the disclosure as a compensation or alignment weld can be integrated into a welding cell. The cycle times can be reduced as a result.

BRIEF DESCRIPTION OF THE DRAWINGS

For an understanding of embodiments of the disclosure, reference is now made to the following description taken in conjunction with the accompanying drawings, in which.

The disclosure is described below by using drawings, in which.

In the figures, the same reference numerals are used for identical or similar components, even though a repeated description is omitted for reasons of simplification.

DETAILED DESCRIPTION

Figure 1:
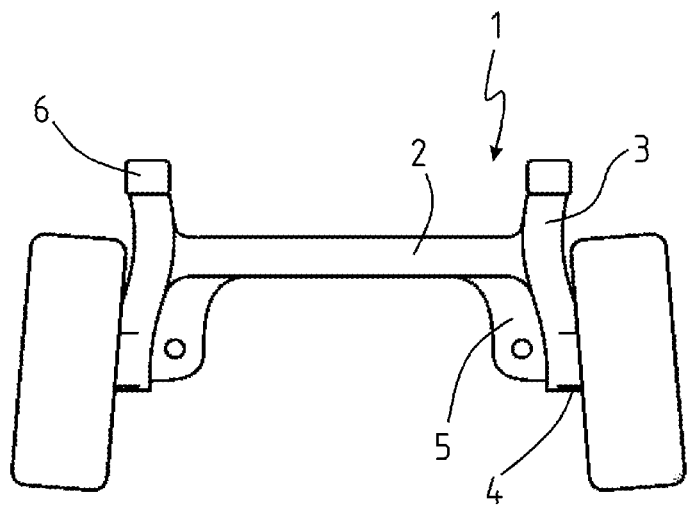
FIG. 1 shows a schematic illustration of an axle component in the form of a twist beam axle.

FIG. 1 shows an axle component in the form of a twist beam axle 1. The twist beam axle 1 is produced from multiple axle parts 2 to 6. Essentially, the twist beam axle 1 has a transverse profile 2, to each end of which a trailing arm 3 is respectively fixed. A wheel carrier 4 is joined to the trailing arms 3, in each case at one end. In addition, spring seats 5 are fixed between the transverse profile 2 and the trailing arms 3. A bearing holder 6 is arranged at the other end of a trailing arm 3.

This is a welded construction, i.e. the axle components, that is to say transverse profile 2, trailing arm 3, wheel carrier 4, spring seat 5 and bearing holder 6, are joined integrally to one another by welding operations.

To establish a target geometry of the axle component 1 or the twist beam axle, the heat induced by a welding operation is utilized.

Figure 2:
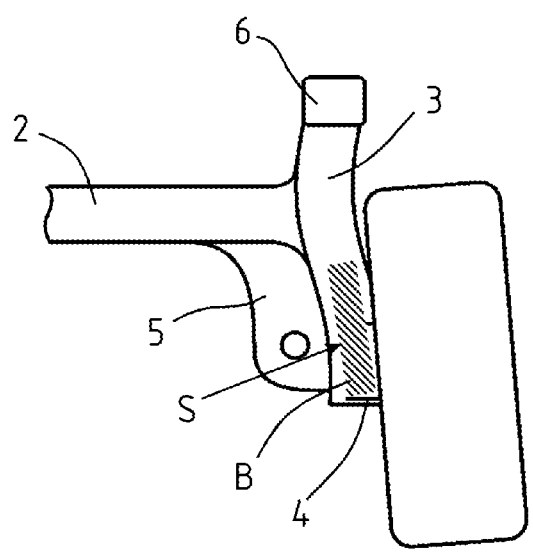
FIG. 2 shows an enlarged detail from the illustration of FIG. 1.

In FIG. 2, the region B in which additional welds S are placed in order to establish the target geometry of the twist beam axle 1 or to align the axle parts, like the wheel carrier 4 and the trailing arm 3, relative to one another, is illustrated in hatched fashion. In this way, setting of the axle parts relative to each other in conformance with tolerances is carried out. The setting of toe and/or camber angles of the wheel carrier 4 is carried out.

In the procedure illustrated in FIG. 2 for producing the axle component 1, blind welds B are placed during the welding operation. These are arranged on the trailing arm 3 in the region of the end on the wheel carrier side. In principle, the target geometry can also be established by utilizing the heat induced by a welding operation via a specifically positioned weld or an additional weld. The respective weld position and geometry are determined with computer assistance and placed during the assembly of the axle parts 3, 4, 5 and 6 or after the assembly of the axle component 1.

The heat induced by the welding operation is used to achieve a compensatory deformation and to compensate for distortion states and to align the axle component 1 and in this way to comply with the tolerance stipulations and to ensure the target geometry of the axle component 1.

Figure 3:
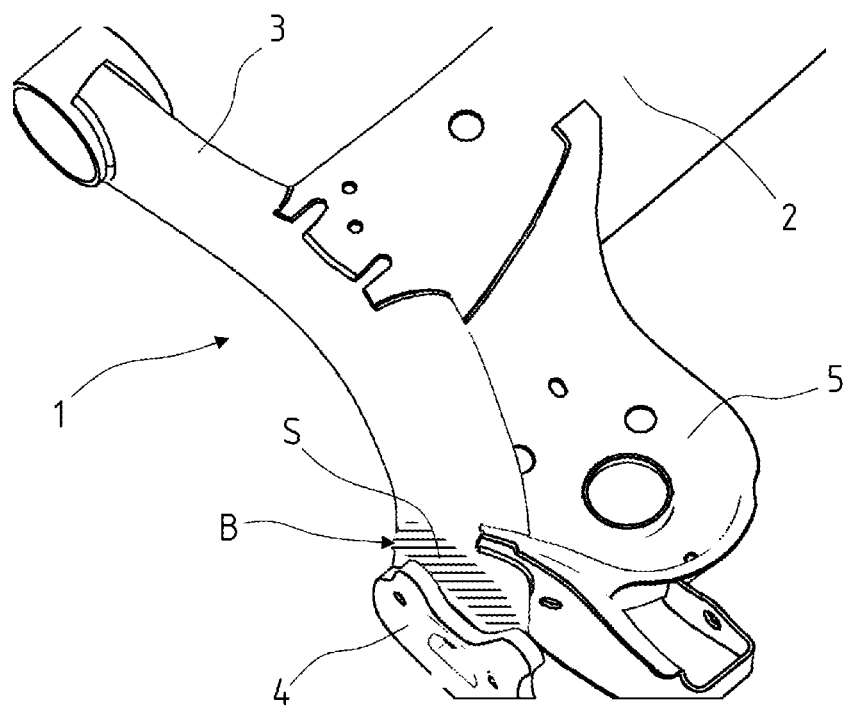
FIG. 3 shows a schematic perspective illustration of a region of an axle component having a first weld.

FIG. 3 shows a further exemplary embodiment, by using which it can be seen more clearly that the weld S in the region B extends on the trailing arm 3 parallel to the wheel carrier 4. By means of this weld S extending parallel to the wheel carrier 4, the camber angle of the axle component 4 is intended to be established.

Figure 4:
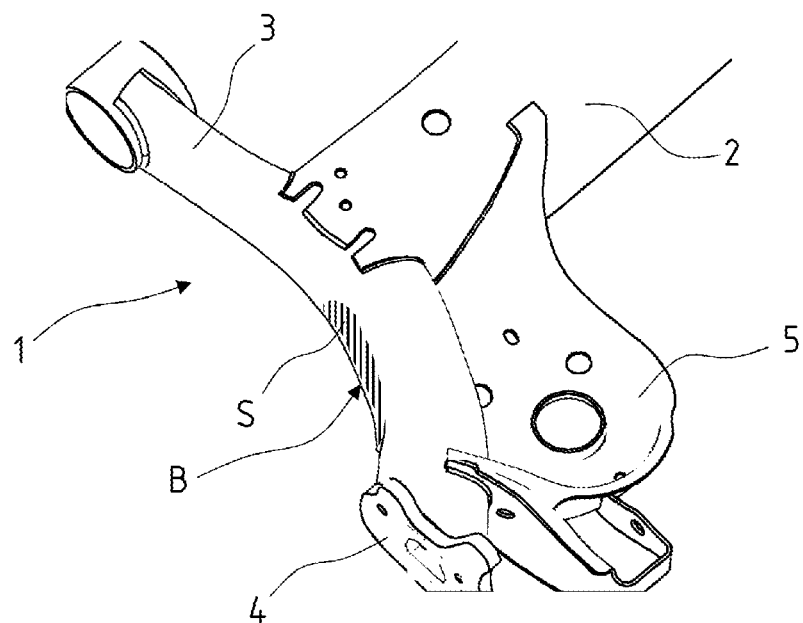
FIG. 4 shows a perspective illustration of a region of an axle component having a second weld.

FIG. 4 shows a further region B with a weld S on the trailing arm 3. The weld S or the region B extends in the longitudinal direction of the trailing arm 3. In this case, the longitudinal direction of the trailing arm 3 is curved, since the trailing arm 3 extends obliquely outward in its length section facing the wheel carrier 4, that is to say points away from the transverse profile 2. In this region between the attachment to the transverse profile 2 and the wheel carrier 4 there is at least one weld S opposite to the spring seat 5, on the outer side of the trailing arm 3. Said additional weld S, also in the form of a blind weld, effects a change in the toe angle of the axle component 1.

The aforesaid welds for influencing toe and/or camber angle are located in the vicinity of the wheel carrier 4. Depending on whether toe or camber angle is to be influenced, the aforesaid additional welds S are located in front of or after the wheel carrier in the direction of travel (toe angle) or on the upper side and/or underside of the trailing arm 3 (camber angle).

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A process of producing an axle component for a motor vehicle, the process comprising:
    joining integrally at least two metallic axle parts to one another to establish a target geometry of the axle component, wherein heat induced by a welding operation is utilized,
    wherein the axle component is measured and the welding operation is performed depending on the target geometry of the axle component, and
    wherein the axle component is measured before the last welding operation, and the target geometry of the axle component is established with the last welding operation.

2. The process according to claim 1, wherein during the welding operation, at least one specifically positioned weld and/or at least one additional weld and/or at least one blind weld is/are placed.

3. The process according to claim 1, wherein a weld position and/or geometry is/are determined with computer assistance and the specifically positioned weld is placed during assembly of the axle component.

4. The process according to claim 1, wherein welding parameters are determined and set in real time during assembly of the axle component.

5. The process according to claim 1, wherein at least one of the metallic axle parts is a wheel carrier and another of the metallic parts is a trailing arm, wherein a camber angle of the axle component is set via at least one specifically positioned additional weld and/or blind weld on the trailing arm.

6. The process according to claim 1, wherein at least one of the additional axle parts is a trailing arm, wherein a toe angle of the axle component is set via a specifically positioned additional weld and/or blind weld, which extends on the trailing arm in the longitudinal direction of the trailing arm.

* * * * *